May 28, 1968 R. H. R. PARKER 3,385,591
WORKHOLDER

Filed March 31, 1965 2 Sheets-Sheet 1

INVENTOR
R. H. R. Parker
BY
ATTORNEY

May 28, 1968    R. H. R. PARKER    3,385,591
WORKHOLDER

Filed March 31, 1965    2 Sheets-Sheet 2

INVENTOR
R. H. R. Parker
BY
ATTORNEY

United States Patent Office 3,385,591
Patented May 28, 1968

3,385,591
WORKHOLDER
Russell Henry Richard Parker, Portchester, England, assignor to J. Evans & Son (Portsmouth) Limited, Portsmouth, England, a British company
Filed Mar. 31, 1965, Ser. No. 444,126
Claims priority, application Great Britain, Apr. 7, 1964, 14,272/64
2 Claims. (Cl. 269—59)

ABSTRACT OF THE DISCLOSURE

A workholder is adjustably mounted on a support by providing the latter with a pair of aligned slots extending longitudinally of the support and a further slot extending transversely. Adjusting studs are rotatably mounted in the workholder and have eccentrically disposed pins engaging in holes in slides positioned in the slots so that by rotating the studs the workholder can be moved longitudinally or transversely relative to the support.

This invention relates to workholders adapted to be detachably secured to a machine or apparatus for operating on workpieces held by clamping means on the workholder.

In the case of a machine or apparatus having a tool or tools mounted in a predetermined position for operating on workpieces, it is essential that the workpieces be presented to the tool or tools in a precise position. If the workholders are intended to be detachably mounted on the machine or apparatus, and more particularly if it is desired to provide a series of interchangeable workholders, it would normally be necessary for each workholder and its component parts to be very accurately made to very close tolerances to ensure that when mounted on the machine or apparatus, the workpieces would be correctly presented relative to the tools. Manufacture to such close tolerances is not only costly but time consuming. An alternative would be to make the clamping means for the workpieces adjustable relative to the workholder, but this complicates the design and manufacture of the workholder as the clamping means must be specially constructed to enable it to be adjusted for alignment with the tools and secured in adjusted position.

It is an object of the present invention to provide a workholder with means whereby it can readily be adjusted on the machine or apparatus so that when assembled with the machine, the workpieces secured by the clamping means will be correctly positioned relative to the tools.

The present invention provides a workholder adapted to be detachably mounted on a machine or apparatus wherein means is provided for adjusting the workholder when mounted on the machine or apparatus, said means comprising members rotatably mounted in the workholder and provided with an eccentrically mounted pin engageable in a slot in the machine or apparatus or a part carried thereby, the arrangement being such that rotation of the said members results in rotation of the eccentrically mounted pins in the said slots so as to impart adjusting movement to the workholder relative to the machine or apparatus, means being provided for locking the said rotatable members in adjusted position.

The invention also includes a workholder assembly comprising a back plate adapted to be detachably secured to the frame of a machine or apparatus for operating on workpieces, at least one transversely extending slot and at least one longitudinally extending slot being formed in the said back plate, a block having a pin receiving aperture slidably mounted in each slot and a workholder as defined in the preceding paragraph assembled with the back plate with the eccentrically mounted pins extending into the apertures in the blocks.

The rotatable members may comprise studs having an eccentrically disposed pin at one end.

The eccentrically mounted pins may be adapted to engage in an aperture in a block which is slidably mounted on an adjacent part of the machine or apparatus or may be guided in grooves formed in said part.

If, as in the case of brush making machines, batches of different types of workpieces such as brush stocks are required to be operated on from time to time, each requiring a different adjustment of the workholder, a series of workholders could be provided, each initially adjusted for a particular type of brush stock, and as the eccentric pins will be locked in their adjusted position, the workholders can be readily interchanged and secured to the machine without any further adujstment being necessary.

To enable the invention to be fully understood, it will now be described, by way of example, with reference to the accompanying drawings in which.

Figure 1:
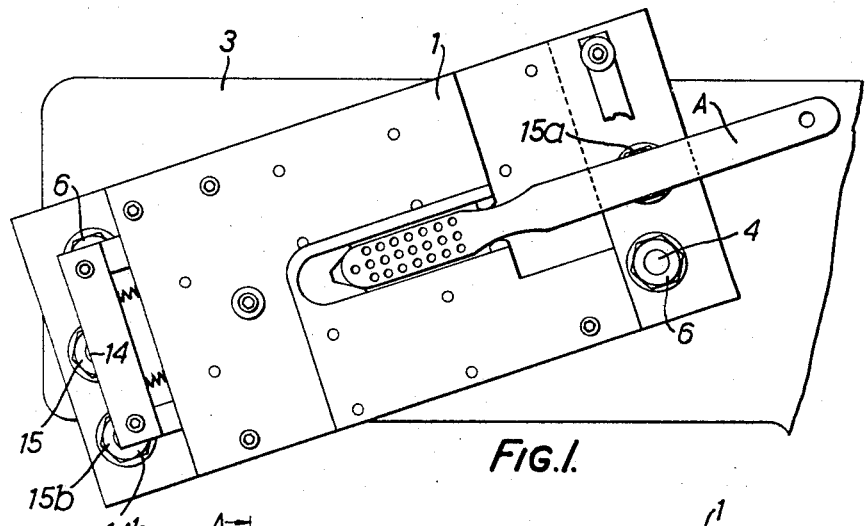
FIGURE 1 is an elevation of a workholder according to one embodiment of the invention.

In the said drawings, the invention is particularly described in connection with a workholder for clamping brush stocks to be drilled or filled in a brush making machine, and as shown, 1 indicates a workholder body, 2 a back supporting plate, and 3 part of the brush making machine, for example, a machine slide to which the workholder is to be detachably mounted.

The back plate 2 is secured to part of the machine indicated by 3 by studs 4, having their opposite ends screw threaded for receiving nuts 5 and 6. The stud is formed with a collar 7 which fits into a countersunk recess on the front face of the plate 2. The body 1 of the workholder is formed with bores 8 for receiving the studs, the bores having a greater diameter than the portion of the stud which extends therethrough.

Figure 8:
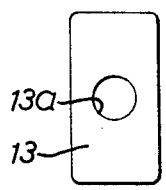
FIGURE 8 is a plan view of one of the sliding blocks.

The back plate 2 is formed with apertures 9 in which the studs 4 make a fairly close fit and is also formed with two longitudinally extending slots or recesses 10, 11, extending inwardly from each opposite side edge of the plate and a transversely extending slot or recess 12 extending from the bottom edge of the plate and opening into the slot or recess 11. A block 13 as illustrated in FIGURE 8 is slidably mounted in each slot or recess, the latter being accurately machined to ensure that the blocks have a free sliding movement without sideplay.

Figure 2:
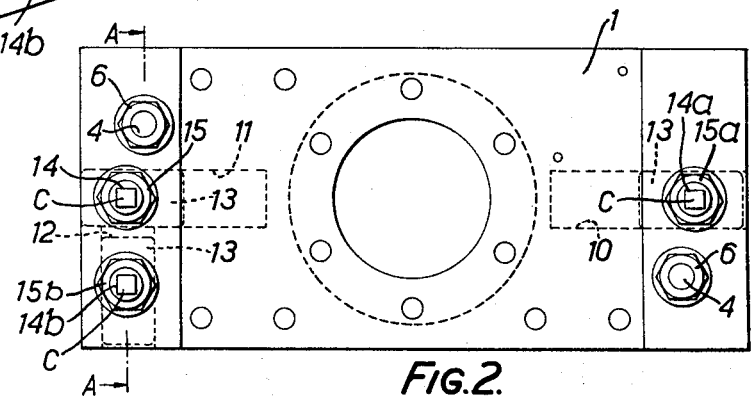
FIGURE 2 is an elevation of the workholder illustrated in FIGURE 1, with the clamping means for the workpieces omitted.
Figure 3:
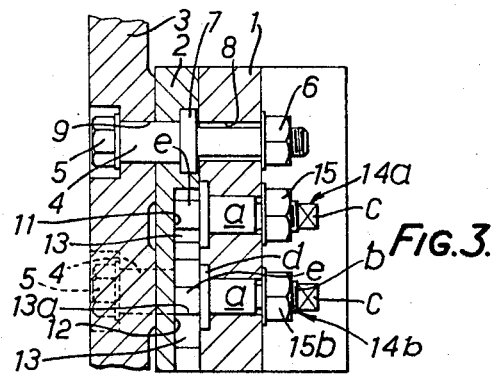
FIGURE 3 is a section on the line A—A of FIGURE 2.
Figure 4:
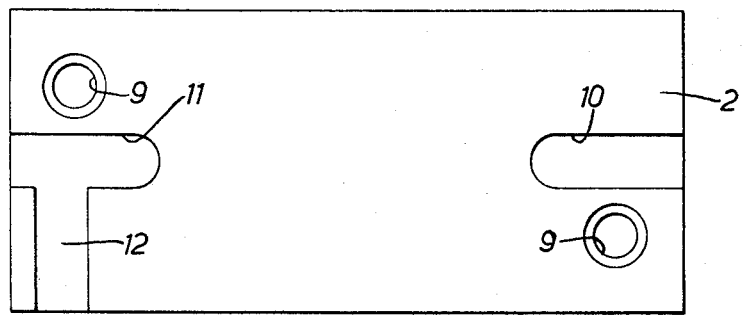
FIGURE 4 is a plan view of the back plate for supporting the workholder.
Figure 5:
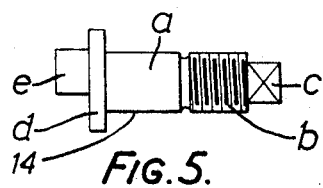
FIGURE 5 is an elevation of one of the adjusting studs.
Figure 6:
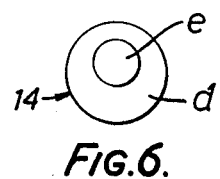
FIGURE 6 is an end view thereof.
Figure 7:
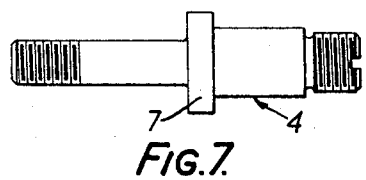
FIGURE 7 is an elevation of one of the locking studs.

Three adjusting studs 14, 14a, 14b are provided, each as illustrated in FIGURES 5 and 6, the studs being rotatably mounted in apertures in the body 1 of the workholder. Each adjusting stud comprises a body portion $a$, a screw threaded nut receiving portion $b$, an end $c$ of square or other non-circular cross section for engagement by a spanner when the stud is to be rotated, a collar $d$ and a pin $e$ which is positioned eccentrically relative to the axis of rotation of the stud in the body of the workholder. The pin $e$ is adapted to be engaged in an aperture 13a in one of the blocks 13 when the workholder is assembled with the back plate as illustrated in FIGURES 2 and 3.

When the workholder assembly is to be used for operating on flat brush stocks, the back plate is normally permanently secured to the machine part 3 by screwing up the nuts 5 so that the collar 7 engages the bottom of the recess in the front face of the back plate.

According to the embodiment illustrated in the drawings, the workholder body 1 is assembled on the back plate 2 with the studs 4 extending through the bores 8, it being then lightly clamped by screwing up nuts 6, the eccentrically mounted pins e entering the apertures 13a in the respective blocks 13 which are positioned in the slots or recesses 10, 11, 12. It will be understood that at the initial setting up of the workholder, the adjusting studs will be in a predetermined neutral position.

In order to adjust the position of the workholder relative to the back plate, the adjusting studs 14 and 14a are rotated in either a clockwise or anti-clockwise direction by applying a spanner to the squared end c. The rotation of the adjusting studs will cause the eccentric to impart a thrust on the blocks, the resultant of which will be to effect the movement of the workholder transversely of the back plate. By applying equally rotational movement in the same direction to each stud 14, 14a, the workholder is adjusted transversely of the back plate, and by applying unequal rotational movements to the studs, the workholder can be adjusted angularly and/or transversely. At the completion of the adjustment of these studs, they are locked in adjusted position by tightening up the nuts 15, 15a.

Longitudinal adjustment of the workholder relative to the back plate is then effected by rotating the adjusting stud 14b, to impart a thrust to the block 13 in the recess 12, the resultant of which will be to effect the movement of the workholder longitudinally with respect to the back plate. After this adjustment has been completed, the stud 14b is locked in adjusted position by tightening the nut 15b. Nuts 6 on studs 4 will then be tightened.

It will be understood that the relative movement between the workholder and the back plate is possible by reason of the bores 8 having a greater diameter than the locking studs 4.

The workholder will noramlly be set up as described above when a particular type of workpiece, for example, a particular type of brush stock such as A, FIGURE 1, is to be operated on, i.e. drilled or filled. Once set up the machine will be operated to drill or fill a batch of such brush stocks, and if the machine is then to be used for operating on a different type of brush stock, the workholder will be removed by unscrewing the nuts 6 and another workholder assembled on the back plate. By providing a series of workholders each set up for a particular type of brush stock, the idle time of the machine can be very considerably reduced between runs as it will require very little time to remove one workholder and substitute another, and there will be no loss of time for effecting adjustments of the workholder once it is assembled on the machine.

The means for clamping the brush stocks on a workholder comprises a fixed jaw and a movable jaw such as fully described in our co-pending application No. 429,312, now Patent No. 3,279,858. It will be understood, however, that the invention can be applied to other types of workholders and further is not necessarily limited to workholders for supporting brush stocks in a brush making machine.

If desired, the back plate can be dispensed with and the blocks 13 mounted in slots or recesses in part of the machine as that indicated by 3.

While the embodiment described including sliding blocks engaged by the eccentrically mounted pins has advantages in that the blocks have relatively large surfaces and thus reduce wear, if desired, the back plate, or the machine part 3 if a back plate is omitted, could be formed with slots or grooves having a width slightly greater than the diameter of the eccentric pins which would be directly entered into said slots or grooves.

The back plate of the workholder may be adapted to be secured to the machine part 3 in a horizontal position or at an angle as shown in FIGURE 1.

When the workholder is removed from the machine, the blocks 13 will normally be left in the slots or recesses, and the workholder body with the adjusting studs locked in adjusted position can then be stored for future use. When it is to be reassembled on the machine, the blocks will be removed from the slots or recesses in the back plate and assembled on the eccentric pins, and as the workholder is slid over the locking studs 4, the blocks will be aligned with the respective slots or recesses by hand.

When, however, curved brush stocks are to be operated on and it is accordingly necessary to move the brush stocks towards and away from the tools during the drilling or filling operation to compensate for the curvature of the surface to be drilled or filled the back plate is adjustably mounted to permit the said compensating movement. According to one arrangement the back plate is attached to the machine slide by studs associated with springs so arranged that the back plate is resiliently urged towards the slide. A roller is mounted on the rear face of the back plate and projects through an opening in the slide into engagement with a thrust block mounted on a fixed part of the machine. The thrust block is contoured to correspond to the curvature of the brush stock, and as the slide is moved longitudinally during the drilling or filling operation, the roller will be urged by the springs into rolling engagement with the contoured surface and accordingly inward and outward movement will be imparted to the back plate and the work-holder assembly mounted thereon to effect the necessary compensating movement of the brush stocks relative to the tools.

I claim:
1. A workholder assembly comprising a workholder, a support therefor, said support having a pair of elongated aligned longitudinally extending slots and a further elongated slot extending transversely of the support at right angles to one of said longitudinal slots, a slide having an aperture mounted in each slot, a series of three adjusting studs rotatably mounted in said workholder, an eccentrically disposed pin on each stud, each pin engaging in a respective said aperture in one of said slides such that rotation of the studs connected with the slides in the first mentioned pair of aligned slots will impart transverse movement to the workholder relative to said support and rotation of the stud connected with the slide in said further slot will effect longitudinal movement of the workholder relative to said support, means being provided for clamping said workholder to said support in adjusted position.

2. A workholder assembly as claimed in claim 1, wherein said clamping means comprise nuts screwing on to screw threaded portions of said studs at the end remote from said pin.

References Cited

UNITED STATES PATENTS 3,283,626 11/1966 Alvey _____ 82—36
3,296,904 1/1967 Bullard _____ 82—36

ROBERT C. RIORDON, Primary Examiner.

J. F. McKEOWAN, Assistant Examiner.